(12) United States Patent
Hyun et al.

(10) Patent No.: US 10,762,479 B2
(45) Date of Patent: Sep. 1, 2020

(54) METHOD AND SYSTEM FOR PROCESSING BLOCKCHAIN-BASED REAL-TIME TRANSACTION

(71) Applicant: SAMSUNG SDS CO., LTD., Seoul (KR)

(72) Inventors: Nyun Soo Hyun, Seoul (KR); Sang Hyeon Kim, Seoul (KR); Jeong Ho Kim, Seoul (KR); Kyung Jin Kim, Seoul (KR); Dae Hyun Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 230 days.

(21) Appl. No.: 15/941,517

(22) Filed: Mar. 30, 2018

(65) Prior Publication Data

US 2018/0293556 A1 Oct. 11, 2018

(30) Foreign Application Priority Data

Apr. 5, 2017 (KR) .................. 10-2017-0044431
Sep. 29, 2017 (KR) .................. 10-2017-0126979

(51) Int. Cl.
  *G06Q 20/06* (2012.01)
  *G06Q 20/40* (2012.01)
  (Continued)

(52) U.S. Cl.
  CPC ..... *G06Q 20/0658* (2013.01); *G06Q 20/3678* (2013.01); *G06Q 20/4014* (2013.01); *H04L 9/3297* (2013.01); *H04L 2209/38* (2013.01)

(58) Field of Classification Search
  CPC .................................................. G06Q 20/06
  (Continued)

(56) References Cited

U.S. PATENT DOCUMENTS 10,387,878 B2* 8/2019 Johnsrud ............. G06Q 20/401
2015/0220928 A1* 8/2015 Allen ................. G06Q 20/0655
705/67

(Continued)

FOREIGN PATENT DOCUMENTS

KR 10-1784219 B1 10/2017

OTHER PUBLICATIONS

"A Brief Survey of Cryptocurrency Systems," by U. Mukhopadhyay, A. Skjellum, O. Hambolu, J. Oakley, L. Yu and R. Brooks. Pub.: 2016 14th Annual Conference on Privacy, Security and Trust (PST) (pp. 745-752). Pub. Date: Dec. 1, 2016. Elec. Pub. Date: Apr. 20, 2017. via IEEE XPLORE (Year: 2016).*

(Continued)

*Primary Examiner* — Sara C Hamilton
(74) *Attorney, Agent, or Firm* — Sughrue Mion, PLLC

(57) ABSTRACT

A blockchain-based method is described which is related to transferring electronic currency from a payer to a payee. In some embodiments, a first process, a second process and a third process are performed. The first process includes receiving a processing request for a target transaction from a terminal of a payer, and transferring the processing request to a first blockchain node among a plurality of blockchain nodes. When a verification result indicates that the target transaction is valid, the method proceeds to performing the second and third processes. The second process includes transferring electronic currency from an electronic wallet of the payer to an electronic wallet of the payee. The third process includes recording data for the target transaction in a new block, and spreading the new block over the blockchain network. In some embodiments, the second process and the third process are performed in parallel.

14 Claims, 8 Drawing Sheets

(51) Int. Cl.
*G06Q 20/36* (2012.01)
*H04L 9/32* (2006.01)

(58) Field of Classification Search
USPC .......................................................... 705/35
See application file for complete search history.

(56) References Cited

U.S. PATENT DOCUMENTS

| | | | | |
|---|---|---|---|---|
| 2015/0287026 A1* | 10/2015 | Yang | G06Q 20/06 | 705/69 |
| 2015/0294308 A1* | 10/2015 | Pauker | G06Q 20/02 | 705/67 |
| 2015/0356524 A1* | 12/2015 | Pennanen | G06Q 20/065 | 705/71 |
| 2015/0356555 A1* | 12/2015 | Pennanen | G06Q 20/06 | 705/71 |
| 2015/0363770 A1* | 12/2015 | Ronca | G06Q 20/382 | 705/66 |
| 2016/0085955 A1* | 3/2016 | Lerner | G06F 21/31 | 726/20 |
| 2016/0125040 A1* | 5/2016 | Kheterpal | G06Q 20/3827 | 707/776 |
| 2016/0162873 A1* | 6/2016 | Zhou | G06Q 20/3227 | 705/67 |
| 2016/0180338 A1* | 6/2016 | Androulaki | G06Q 20/3829 | 705/71 |
| 2016/0218879 A1* | 7/2016 | Ferrin | G09C 1/00 | |
| 2016/0292672 A1* | 10/2016 | Fay | G06Q 20/363 | |
| 2016/0323109 A1* | 11/2016 | McCoy | G06Q 50/184 | |
| 2016/0330031 A1* | 11/2016 | Drego | H04L 9/3239 | |
| 2016/0335628 A1* | 11/2016 | Weigold | G06Q 20/065 | |
| 2016/0342977 A1* | 11/2016 | Lam | G06Q 20/02 | |
| 2017/0005804 A1* | 1/2017 | Zinder | H04L 9/3247 | |
| 2017/0053249 A1* | 2/2017 | Tunnell | H04L 9/3228 | |
| 2017/0078493 A1* | 3/2017 | Melika | G06Q 20/36 | |
| 2017/0091750 A1* | 3/2017 | Maim | H04L 9/30 | |
| 2017/0132625 A1* | 5/2017 | Kennedy | G06Q 20/065 | |
| 2017/0132626 A1* | 5/2017 | Kennedy | G06Q 20/065 | |
| 2017/0132630 A1* | 5/2017 | Castinado | G06Q 20/382 | |
| 2017/0161734 A1* | 6/2017 | Bankston | G06Q 20/3829 | |
| 2017/0178237 A1* | 6/2017 | Wong | G06Q 20/065 | |
| 2017/0185998 A1* | 6/2017 | Jung | G06Q 20/0655 | |
| 2017/0230189 A1* | 8/2017 | Toll | H04L 9/3247 | |
| 2017/0237570 A1* | 8/2017 | Vandervort | H04L 63/0442 | 713/176 |
| 2017/0243177 A1* | 8/2017 | Johnsrud | G06Q 20/389 | |
| 2017/0243209 A1* | 8/2017 | Johnsrud | G06Q 20/40 | |
| 2017/0243212 A1* | 8/2017 | Castinado | H04L 9/3236 | |
| 2017/0243214 A1* | 8/2017 | Johnsrud | G06Q 20/3823 | |
| 2017/0270527 A1* | 9/2017 | Rampton | G06Q 20/102 | |
| 2017/0286951 A1* | 10/2017 | Ignatchenko | G06Q 20/401 | |
| 2017/0308872 A1* | 10/2017 | Uhr | G06Q 20/36 | |
| 2017/0346833 A1* | 11/2017 | Zhang | H04L 9/3239 | |
| 2017/0357966 A1* | 12/2017 | Chandrasekhar | G06Q 20/3829 | |
| 2017/0372417 A1* | 12/2017 | Gaddam | G06Q 20/065 | |
| 2018/0053158 A1* | 2/2018 | White | G06Q 20/065 | |
| 2018/0053161 A1* | 2/2018 | Bordash | G06Q 20/02 | |
| 2018/0060860 A1* | 3/2018 | Tian | G06Q 20/3674 | |
| 2018/0068130 A1* | 3/2018 | Chan | G06F 21/6227 | |
| 2018/0075453 A1* | 3/2018 | Durvasula | G06Q 20/4016 | |
| 2018/0089644 A1* | 3/2018 | Chen | G06Q 20/10 | |
| 2018/0096316 A1* | 4/2018 | Mendez | G06Q 20/065 | |
| 2018/0096349 A1* | 4/2018 | McDonald | G06Q 20/0658 | |
| 2018/0101906 A1* | 4/2018 | McDonald | G06Q 40/04 | |
| 2018/0109541 A1* | 4/2018 | Gleichauf | H04L 67/1097 | |
| 2018/0121918 A1* | 5/2018 | Higgins | G06Q 20/02 | |
| 2018/0150816 A1* | 5/2018 | Liu | G06Q 20/202 | |
| 2018/0158051 A1* | 6/2018 | Arora | G06Q 20/3829 | |
| 2018/0173719 A1* | 6/2018 | Bastide | G06F 17/24 | |
| 2018/0204191 A1* | 7/2018 | Wilson | H04L 9/30 | |
| 2018/0240086 A1* | 8/2018 | Sobotka | G06Q 20/06 | |
| 2018/0247302 A1* | 8/2018 | Armstrong | G06Q 20/3827 | |
| 2018/0253702 A1* | 9/2018 | Dowding | G06Q 20/06 | |
| 2019/0005470 A1* | 1/2019 | Uhr | H04L 9/0869 | |
| 2019/0005558 A1* | 1/2019 | Morris | G06Q 20/387 | |
| 2019/0013931 A1* | 1/2019 | Benini | H04L 9/3073 | |
| 2019/0066065 A1* | 2/2019 | Wright | G06Q 20/06 | |
| 2019/0068365 A1* | 2/2019 | Wright | H04L 9/0637 | |
| 2019/0102758 A1* | 4/2019 | Wright | G06Q 20/382 | |
| 2019/0238550 A1* | 8/2019 | Zhang | H04L 9/3239 | |
| 2019/0287095 A1* | 9/2019 | Gaddam | G06Q 20/356 | |
| 2019/0288854 A1* | 9/2019 | Xie | H04L 63/08 | |
| 2019/0303887 A1* | 10/2019 | Wright | G06F 16/27 | |
| 2019/0303931 A1* | 10/2019 | Valencia | G06Q 20/3229 | |
| 2019/0310980 A1* | 10/2019 | Zhang | G06F 16/2365 | |
| 2019/0340361 A1* | 11/2019 | Daniel | H04W 12/10 | |
| 2019/0386834 A1* | 12/2019 | Furukawa | H04L 9/32 | |
| 2019/0394047 A1* | 12/2019 | Karame | H04L 63/14 | |

OTHER PUBLICATIONS

"Performance Comparison of Executing Fast Transactions in Bitcoin Network Using Verifiable Code Execution," by P. Singh, B.R. Chandavarkar, S. Arora and N. Agrawal. Pub. Date: Dec. 1, 2013. Last Update Date: Feb. 7, 2014. Elec. Pub. Date: Jan. 15, 2014. via IEEE XPLORE (Year: 2013).*

* cited by examiner

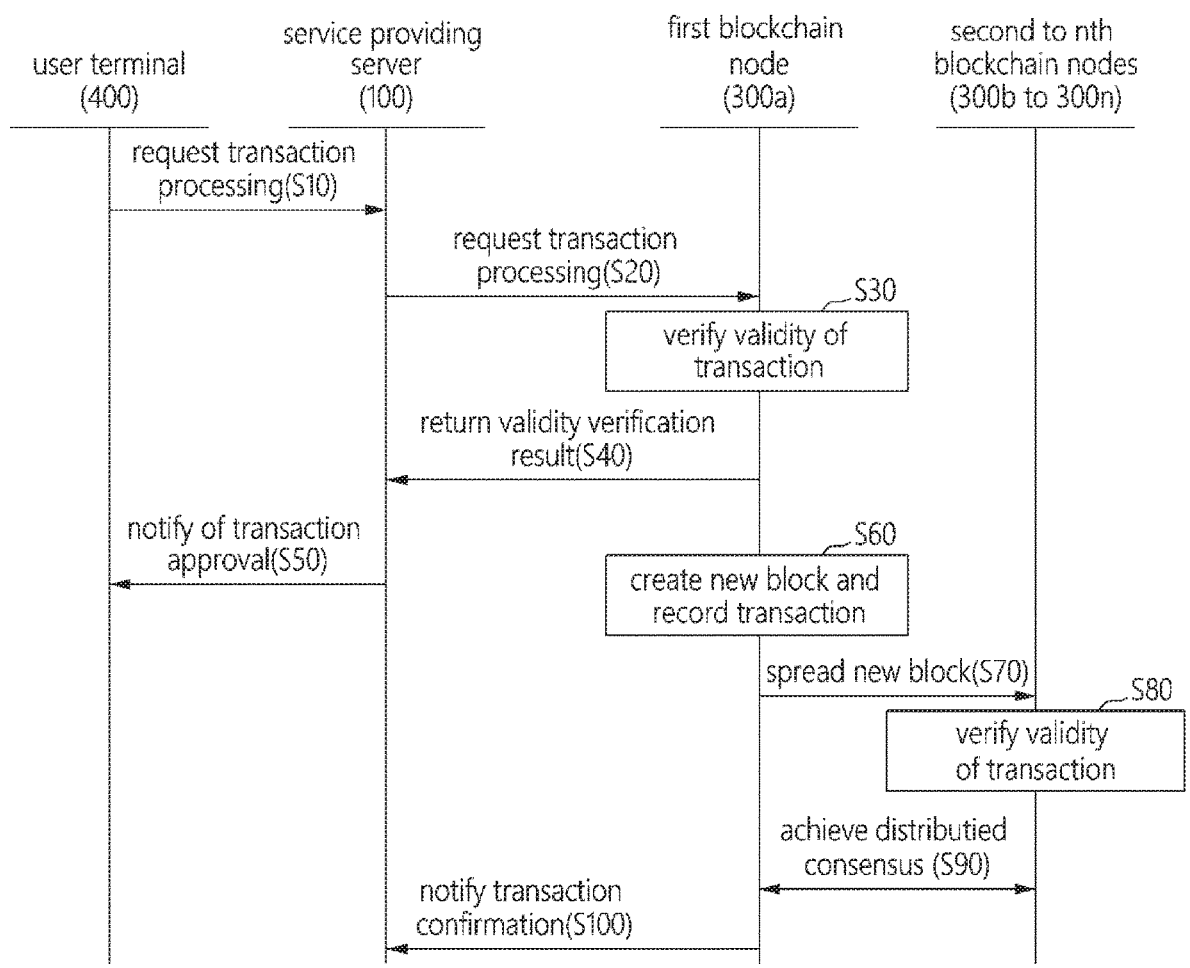

METHOD AND SYSTEM FOR PROCESSING BLOCKCHAIN-BASED REAL-TIME TRANSACTION

This application claims priority from Korean Patent Application No. 10-2017-0044431 filed on Apr. 5, 2017 and No. 10-2017-0126979 filed on Sep. 29, 2017 in the Korean Intellectual Property Office, the disclosure of both of which are hereby incorporated by reference in their entirety.

BACKGROUND

1. Field of the Disclosure

The present disclosure relates to a method and system for processing a blockchain-based real-time transaction, and more particularly, to a method of providing a real-time transaction processing service on the basis of a blockchain with no structural change in a blockchain network and a system for performing the method.

2. Description of the Related Art

A blockchain refers to data management technology, in which continuously growing data is recorded in certain units of block and nodes of a peer-to-peer (P2P) network manages the blocks in a chain-form data structure, or refers to data itself of the chain-form data structure. In this case, blockchain data of the chain-form data structure is managed in the form of a distributed ledger at each individual node, without a central system.

Each individual blockchain node of a blockchain network manages blocks in a data structure such as that shown in FIG. 1. Here, each block is recorded with a hash value of a previous block, so that the previous block can be referred to by the hash value. Therefore, as more blocks are added, it becomes difficult to forge transaction data recorded in the block, and the transaction data recorded in each block is improved in reliability.

A transaction processing system based on the above blockchain processes a transaction requested according to, for example, the procedure shown in FIG. 2. Referring to FIG. 2, when a transaction processing request is received from a payer terminal of a electronic currency (①), validity verification for a transaction is performed to prevent double-spending or the like (②), and transaction data is transmitted to a block creating node in the case of a valid transaction (③). Next, the block creating node records the transaction data in a new block (④), and the new block is spread over the blockchain network to achieve a distribution consensus (⑤). When the transaction is finally confirmed by the distribution consensus, a predetermined electronic currency is transferred from an electronic wallet of a payer to an electronic wallet of a payee (⑥).

With the foregoing procedure, the blockchain-based transaction processing system has advantages of providing a safe transaction service for parties concerned with the transaction without any central management system. However, in accordance with the above procedure, a transaction is not approved and confirmed until a new block is created through a mining process and then verified by each blockchain node. Therefore, a real-time transaction processing service can not be provided.

For example, since a bitcoin blockchain that provides a transaction processing service according to the above procedure has an average block creation time of about 10 minutes, it may take more than 10 minutes to process a requested transaction in some cases.

SUMMARY

Aspects of the present disclosure provide a blockchain-based real-time transaction processing method and a system for performing the same.

According to an aspect of the present disclosure, there is provided a blockchain-based real-time transaction processing method performed by a blockchain-based transaction processing system including a service-providing server and a plurality of blockchain nodes constituting a blockchain network, the blockchain-based real-time transaction processing method comprising: performing, by the service-providing server, a first process, the first process comprising: receiving a processing request for a target transaction from a terminal of a payer, wherein the payer is a first user of the blockchain network, transferring the processing request to a first blockchain node among the plurality of blockchain nodes in response to the receiving, and acquiring a verification result for the target transaction from the first blockchain node; when the verification result indicates that the target transaction is valid: performing, by the service-providing server, a second process, the second process comprising transferring a transfer amount of electronic currency from an electronic wallet of the payer to an electronic wallet of a payee according to the target transaction, and performing, by a second blockchain node among the plurality of blockchain nodes, a third process, the third process comprising: recording data for the target transaction in a new block, and spreading the new block over the blockchain network, wherein the second process and the third process are performed in parallel.

According to another aspect of the present disclosure, there is provided a blockchain-based real-time transaction processing system comprising: a plurality of blockchain nodes comprising a first blockchain node and a second blockchain node, wherein the plurality of blockchain nodes form a blockchain network; and a service-providing server, wherein the service-providing server is configured to perform a first process including: receiving a processing request for a target transaction from a terminal of a payer, wherein the payer is a first user of the blockchain network, transferring the processing request for the target transaction to the first blockchain node, acquiring a verification result for the target transaction from the first blockchain node, and wherein the service-providing server is configured to, when the verification result indicates that the target transaction is valid, perform a second process including: transferring a transfer amount of electronic currency from an electronic wallet of the payer to an electronic wallet of a payee according to the target transaction, and wherein a second blockchain node among the plurality of blockchain nodes performs, when the verification result indicates that the target transaction is valid, a third process of recording data for the target transaction in a new block, and spreading the new block over the blockchain network, and wherein the second process and the third process are performed in parallel.

It should be noted that objects of the present disclosure are not limited to the above-described objects, and other objects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which:

FIG. 8 is a flowchart of a blockchain-based real-time transaction processing method according to another embodiment of the present disclosure.

DETAILED DESCRIPTION OF THE EMBODIMENTS

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Prior to the description of this specification, some terms used in this specification will be defined.

Figure 1:
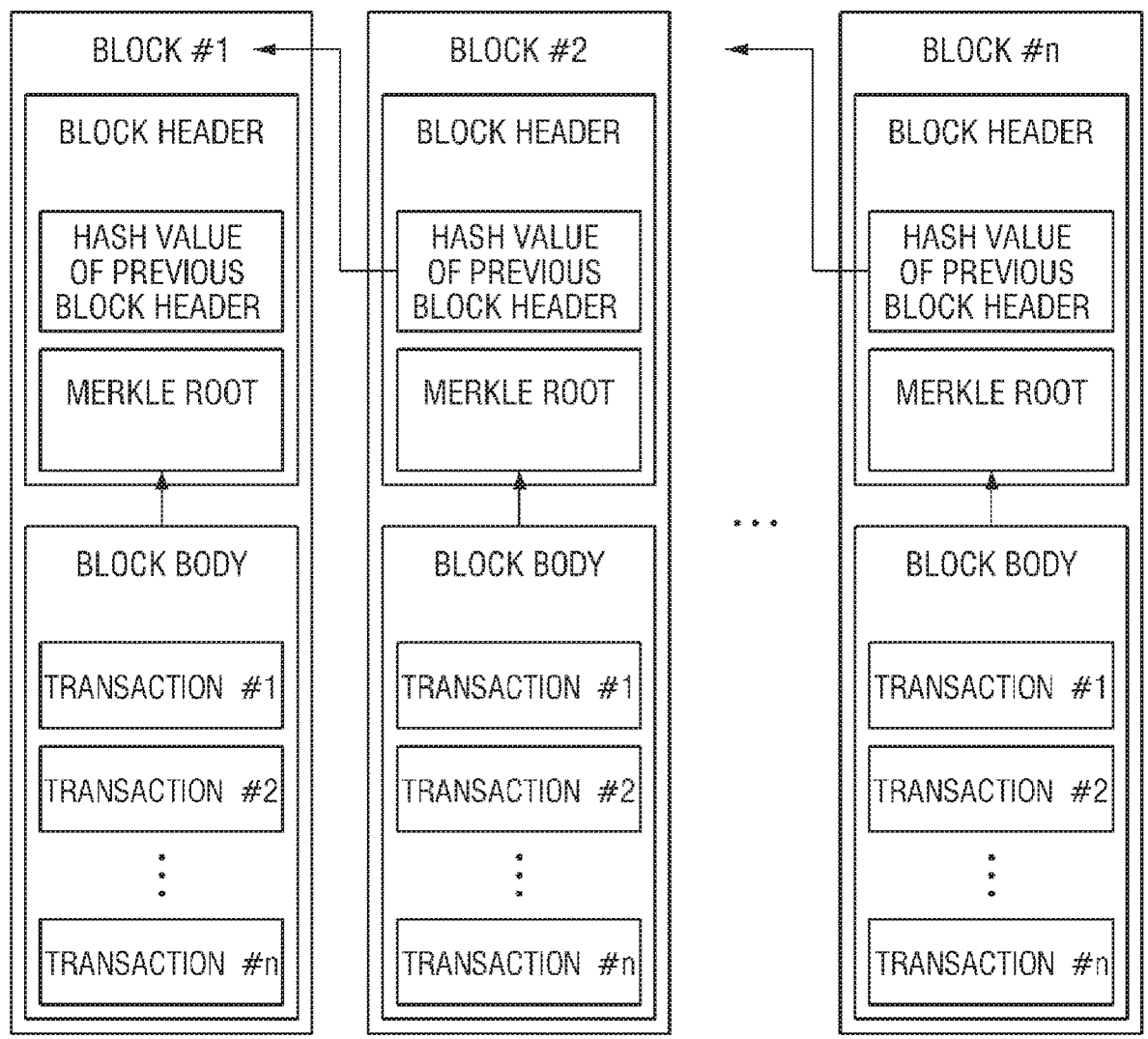
FIG. 1 is a view illustrating a structure of blockchain data that may be referenced in some embodiments of the present disclosure.
Figure 2:
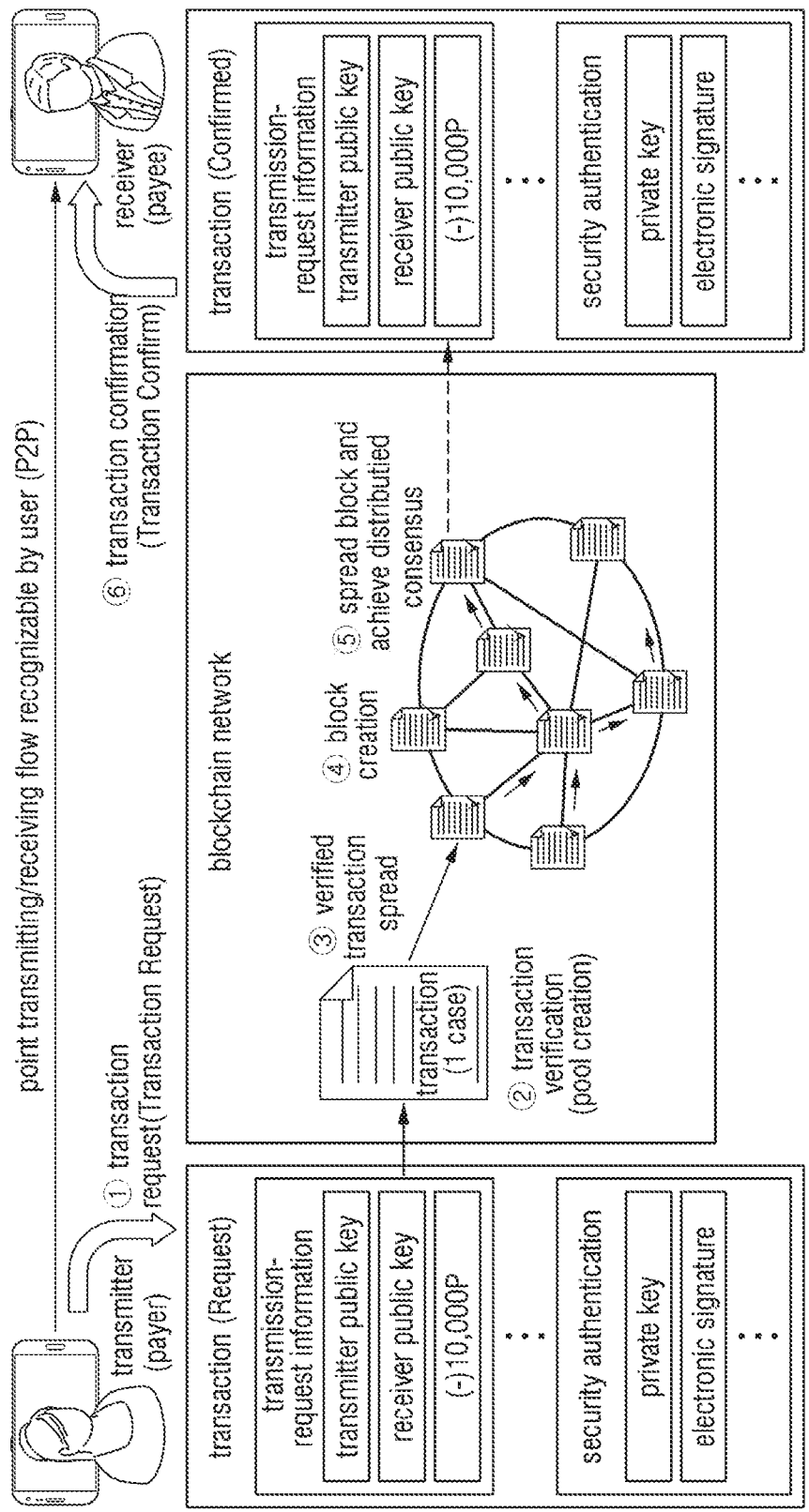
FIG. 2 is a diagram illustrating a transaction processing procedure performed by a conventional blockchain-based transaction processing system.

In this specification, blockchain data or blockchain itself refers to data maintained by each individual blockchain node of a blockchain network and indicates data in which at least one block is configured in a chain-form data structure. When data recorded in each individual block is transaction data, the blockchain data may be used as a distributed ledger. However, the kind of data to be recorded in each individual block may be varied as desired. The structure of the blockchain data is shown in FIG. 1.

In this specification, the blockchain network refers to a network of a peer-to-peer (P2P) structure having a plurality of blockchain nodes that operates in accordance with a blockchain algorithm.

In this specification, a blockchain node refers to an entity that forms the blockchain network and maintains and manages blockchain data on the basis of a blockchain algorithm. The blockchain node may be implemented as a single computing apparatus, but may also be achieved using a virtual machine or the like. When the virtual machine is used as the blockchain node, a plurality of blockchain nodes may be present in the single computing apparatus.

In this specification, a block creating node refers to a node for creating new blocks through mining among the blockchain nodes of the blockchain network.

In this specification, a electronic currency in a broad sense refers to a electronic currency to be transacted in cyberspace without real objects. In a narrow sense, the electronic currency refers to a electronic currency issued through mining in the blockchain, like bitcoins.

In this specification, permission may be understood as a comprehensive concept including authentication and authorization.

Hereinafter, some embodiments of the present disclosure will be described in detail with reference to the accompanying drawings.

Figure 3:
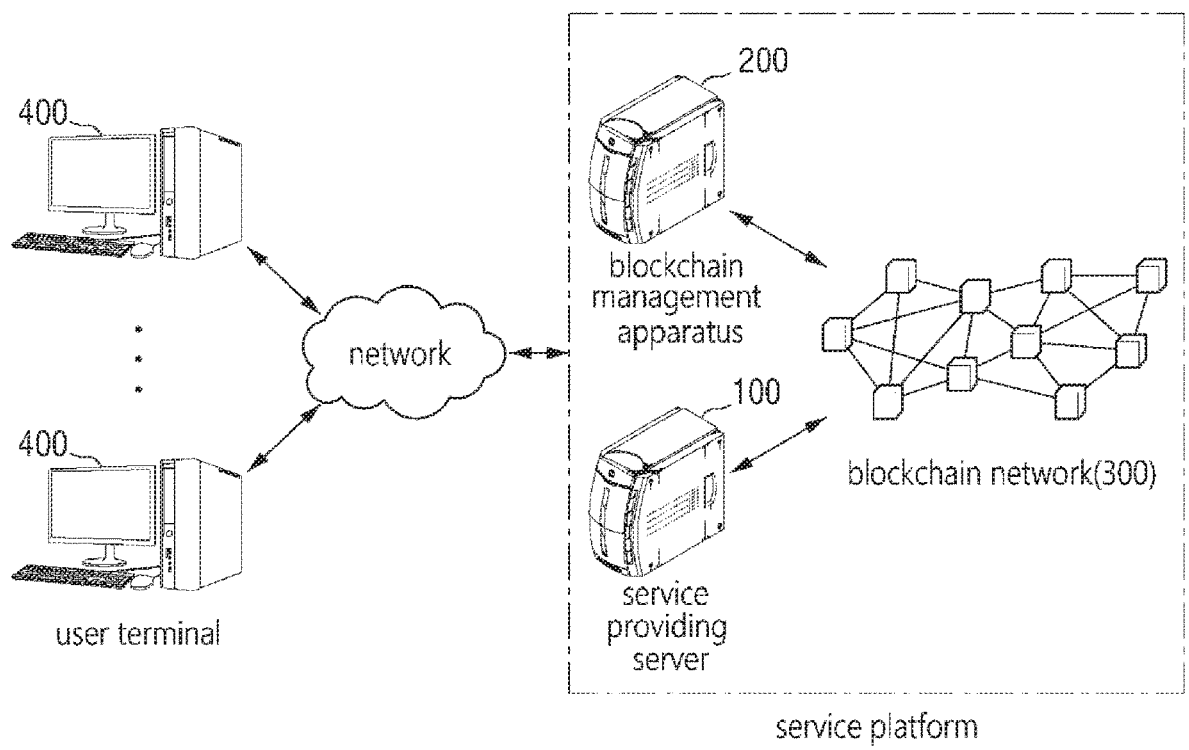
FIG. 3 is a block diagram of a blockchain-based real-time transaction processing system according to an embodiment of the present disclosure.

FIG. 3 is a block diagram of a blockchain-based real-time transaction processing system according to an embodiment of the present disclosure.

Referring to FIG. 3, the blockchain-based real-time transaction processing system may include a service providing server 100, a blockchain management apparatus 200, a blockchain network 300, and a user terminal 400. However, this is merely an exemplary embodiment for achieving an object of the present disclosure, and it will be appreciated that some elements may be included or excluded if necessary. Further, the elements of the blockchain-based real-time transaction processing system shown in FIG. 3 indicate functional elements that are classified by function, and it will be appreciated that at least one element may be given in combination form in a real physical environment. For example, the service providing server 100 and the blockchain management apparatus 200 may be implemented as a single physical computing apparatus, and the service providing server 100 and/or the blockchain management apparatus 200 may be implemented as at least one blockchain node of the blockchain network 300. The elements of the blockchain-based real-time transaction processing system will be described below.

In the blockchain-based real-time transaction processing system, the service providing server 100 is a computing apparatus that interoperates with the blockchain network 300 and provides a real-time transaction service. Here the computing apparatus may include a notebook computer, a desktop computer, a laptop computer, etc. without limitation, and may include any kind of apparatus including an operating unit and a communicating unit.

The service providing server 100 receives various kinds of requests from a user terminal 400 that uses a real-time transaction service and interoperates with the blockchain network 300 to process the received various kinds of requests. Detail operation of the service providing server 100 will be described below with reference to FIG. 4A and the following figures.

In the blockchain-based real-time transaction processing system, the blockchain management apparatus 200 is a computing apparatus that monitors and manages a plurality of blockchain bodes constituting the blockchain network 300. Here the computing apparatus may include a notebook computer, a desktop computer, a laptop computer, etc. without limitation, and may include any kind of apparatus including an operating unit and a communicating unit.

According to an embodiment of the present disclosure, the blockchain management apparatus 200 may calculate an average block creation time required for the blockchain network 300 to create a new block and may periodically or non-periodically adjust the block creation time on the basis of the calculated average block creation time. In detail, when the calculated average block creation time is longer than a predetermined target time, the blockchain management apparatus 200 may lower the degree of difficulty of block creation to adjust the block creation time. According to this embodiment, it is possible to shorten a time required for creating a new block by setting the target time to be small, and thus it is possible to quickly perform a transaction confirm in the blockchain network 300.

The target time may be a value that varies depending on a predetermined constant value or a predetermined condition. For example, the target time may be a value that dynamically varies depending on the degree of reliability of the blockchain network 300. Also, the degree of reliability of the blockchain network 300 may be determined according to the degree of permission verification performed by the blockchain network 300. In more detail, for example, when permission verification is performed only on a user who has requested a transaction in the blockchain network 300, the degree of reliability of the blockchain network 300 may be determined as a first degree of reliability. Also, when permission verification is additionally performed on an electronic wallet application installed in the user terminal 400 in the blockchain network 300, the degree of reliability of the blockchain network 300 may be determined as a second degree of reliability higher than the first degree of reliability. Also, when permission verification is additionally performed on a new block that is created by a block creating node in the blockchain network 300, the degree of reliability of the blockchain network 300 may be determined as a third degree of reliability higher than the second degree of reliability. In this case, the target time may be set to the smallest value when the reliability of the blockchain network 300 is determined as the third degree of reliability, and the target time may be set to the largest value when the reliability of the blockchain network 300 is determined as the first degree of reliability.

In the above-described embodiment, the blockchain management apparatus 200 may receive block creation time information from a monitoring node, which is a special node of the blockchain network 300 and may calculate an average block creation time on the basis of the received block creation time information. Detailed operation of the monitoring node will be described below.

In the blockchain-based real-time transaction processing system, the blockchain network 300 may include a plurality of blockchain nodes operating according to a blockchain algorithm. The plurality of blockchain nodes verifies validity of a corresponding transaction in response to a transaction processing request of the service providing server 100, records the verified transaction in a new block, and spreads the block over the blockchain network 300. Each of the blockchain nodes maintains the same blockchain data.

According to an embodiment of the present disclosure, the blockchain network 300 may be implemented as a permission-based blockchain network. That is, the blockchain network 300 may be a limited network in which only participants (e.g., a user or a blockchain node) having verified permission can participate. Here, the permission-based blockchain network may be used interchangeably with the term "private blockchain network" or the like in the art, which may have the same meaning. According to this embodiment, participation of unspecified nodes and transaction requests of unauthorized users may be restricted. That is, the reliability of a user using a transaction service, a transaction requested by the user, a node processing the transaction, etc., may be secured in advance. Accordingly, it is possible to alleviate excessive requirements for proof of work needed to create a block and also to provide a real-time transaction processing service based on the secured reliability. This embodiment will be additionally described in detail with reference to FIGS. 4A to 5.

Also, according to an embodiment of the present disclosure, the blockchain network 300 may distribute and store first blockchain data and second blockchain data that is separate from the first blockchain data. In this case, the first blockchain data may refer to an authentication blockchain in which permission information for a user and a blockchain node is recorded, and the second blockchain data may refer to a transaction blockchain in which a transaction history is recorded. That is, the blockchain network 300 may manage data having different uses by means of different blockchains. In the permission-based blockchain network 300, the first blockchain data is used for permission verification, and the second blockchain data is used for transaction processing. This embodiment will be additionally described in detail with reference to FIGS. 4A and 4B.

According to an embodiment of the present disclosure, at least one of the plurality of blockchain nodes constituting the blockchain network 300 may be a monitoring node. The monitoring node refers to a special type of node that monitors states and operations of the other blockchain nodes, as described above. In particular, the monitoring node may monitor that a block creating node among the plurality of blockchain nodes creates a new block. In detail, the monitoring node may receive a new block spread over the blockchain network 300 and may calculate a block creation time on the basis of a timestamp value recorded in the new block in response to the reception of the new block. For example, when a first block with a block number k (k is a natural number) and then a second block with a block number k+1 are received, the monitoring node may calculate a block creation time on the basis of a difference between a first stamp recorded in the first block and a second timestamp recorded in the second block. The calculated block creation time may be transmitted to the blockchain management apparatus 200 and used by the blockchain management apparatus 200 to control the block creation time.

In the blockchain-based real-time transaction processing system, the user terminal 400 is a terminal of a user who uses a blockchain-based real-time transaction service. The user, who is one of transaction parties, may be payer or payee.

An electronic wallet application may be installed in the user terminal 400 to receive a real-time transaction service. An application programming interface (API) key may be issued by the service providing server 100 and/or the blockchain management apparatus 200 in order to perform permission verification on the electronic wallet application. The issued API key may be recorded in a blockchain data distributed and managed by the blockchain network 300.

The elements of the blockchain-based real-time transaction processing system shown in FIG. 3 may communicate with one another over a network. Here, the network may be achieved by any kinds of wired/wireless networks such as a local area network (LAN), a wide area network (WAN), a mobile radio communication network, wireless broadband Internet (WiBro), etc.

The configuration of the blockchain-based real-time transaction processing system according to an embodiment of the present disclosure has been described with reference to FIG. 3. A procedure in which a real-time transaction is processed in the blockchain-based real-time transaction processing system will be described below with reference to FIGS. 4A to 5.

Figure 4A:
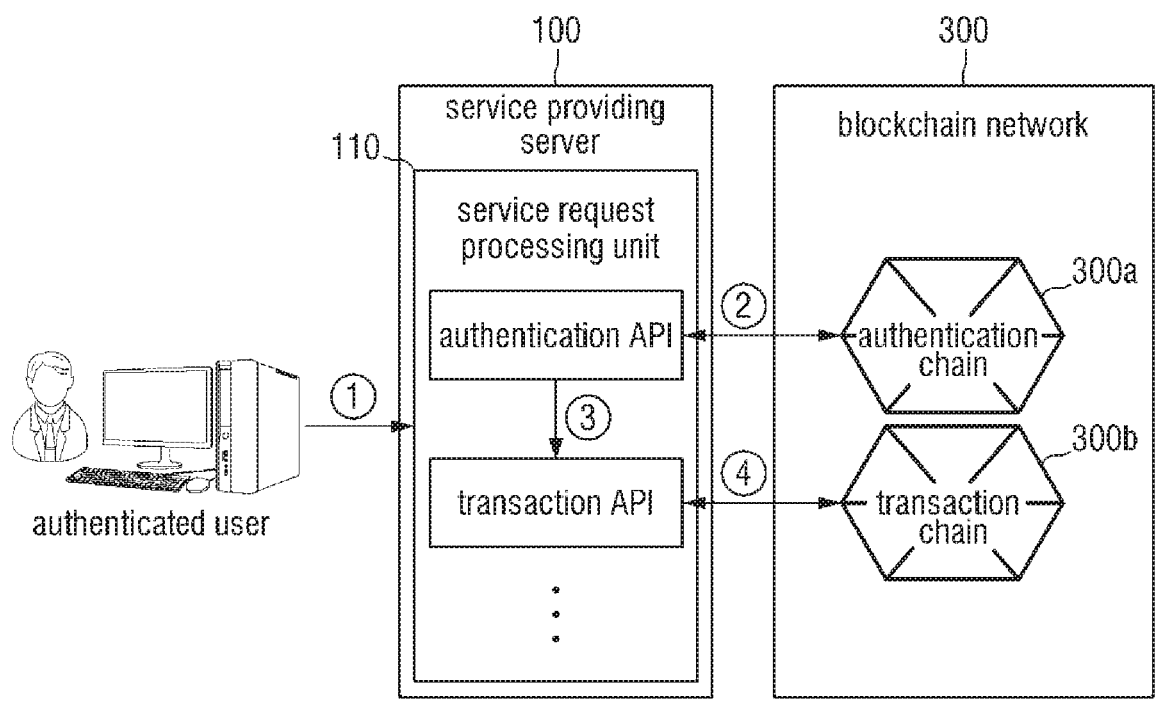
FIGS. 4A and 4B are diagrams for comparing and illustrating procedures of processing transactions requested by an authenticated user and an unauthenticated user.
Figure 4B:
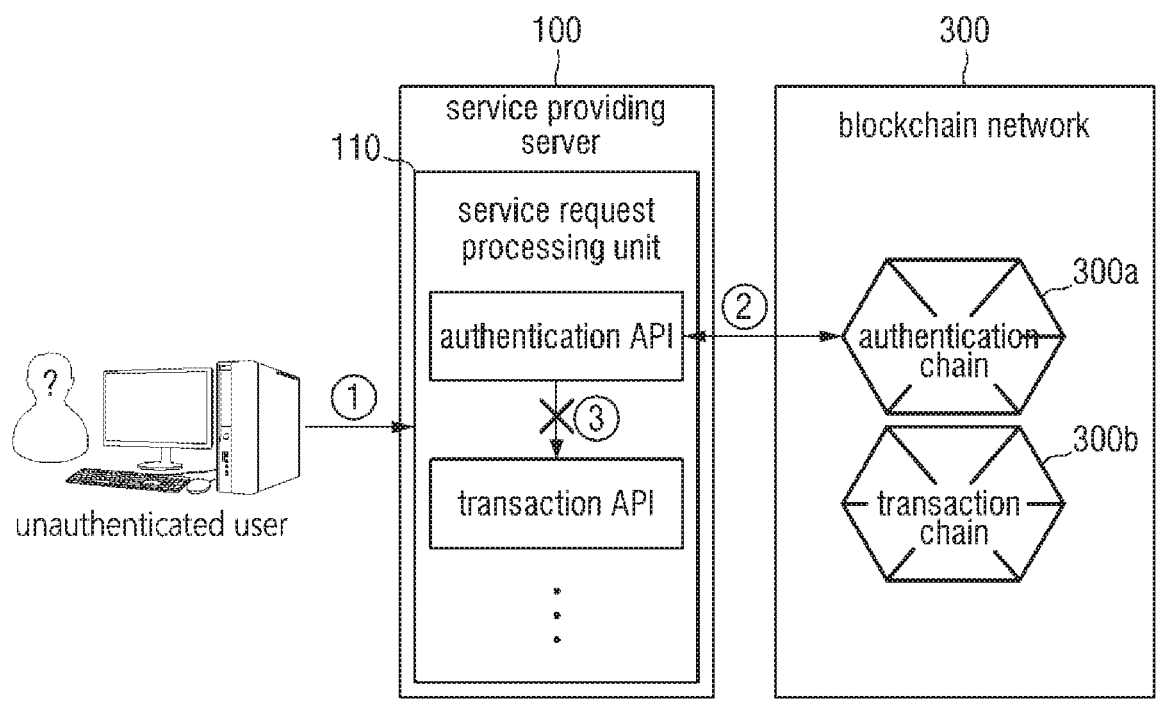

FIGS. 4A and 4B are diagrams for comparing and illustrating procedures of processing transactions requested by an authenticated user and an unauthenticated user. In detail, FIG. 4A shows a procedure in which a transaction requested by an authenticated user (hereinafter referred to as a "first user") is processed, and FIG. 4B shows a procedure in which an transaction requested by an unauthenticated user (hereinafter referred to as a "second user") is processed.

First, referring to FIG. 4A, a service providing server 100 performs permission verification on the first user (②) in response to a transaction processing request received from the first user (①). The permission verification may be performed on the basis of permission information recorded in an authentication blockchain 300*a*.

In detail, the service providing server 100 may receive identification information of the first user along with the transaction processing request, acquire the permission information of the first user from the authentication blockchain 300*a* by means of the received identification information, and perform permission verification on the first user through the acquired permission information of the first user. In this case, the identification information may be an ID, the user's name, an electronic signature, etc., and the permission information recorded in the authentication blockchain 300*a* may be a public key, a certificate, a password, etc., which may vary depending on the implementation of the system. As reference, when a public key of the user is used as the permission information, the permission verification may be performed by verifying an electronic signature of the first user, which is included in transaction data.

According to an embodiment of the present disclosure, the service providing server 100 may additionally perform permission verification on an application installed in a terminal of the first user. In detail, the service providing server 100 may receive API key information of an electronic wallet application installed in the terminal of the first user along with the transaction processing request and may perform permission verification on the electronic wallet application by verifying whether the received API key information is recorded in the authentication blockchain 300*a*. That is, the API key information of the electronic wallet application may be configured in a white list and then distributed and stored in the authentication blockchain 300*a*, and the permission verification may be performed on the electronic wallet application by using the white list. Depending on the embodiment, the API key information of the electronic wallet application may also be configured in a black list and then distributed and stored in the authentication blockchain 300*a*.

In this way, when the permission of the first user and/or the electronic wallet application installed in the terminal of the first user is verified, the service providing server 100 process the transaction requested by the first user ((③, ④)). In this case, data of the request transaction may be recorded in a transaction blockchain 300*b* configured as a chain separate from the authentication blockchain 300*a*. As reference, the authentication blockchain 300*a* and the transaction blockchain 300*b* may be distributed and managed by the same blockchain node or by at least partially different blockchain nodes. This may vary depending on the embodiment as desired.

Subsequently, a case in which a transaction processing request is received from a terminal of the second user, who is an unauthenticated user, will be described with reference to FIG. 4B.

Referring to FIG. 4B, a service providing server 100 performs permission verification on the second user (②) in response to a transaction processing request received from the terminal of the second user (①). The permission verification may include permission verification for the second user and/or permission verification for an electronic wallet application installed in the terminal of the second user, as described above.

A result of the permission verification is that authentication fails or the second user has no authority. In this case, the transaction processing request from the second user is rejected (③).

The procedures in which transactions requested by an authenticated user and an unauthenticated user are processed in the permission-based blockchain network have been compared and illustrated with reference to FIGS. 4A and 4B. As described above, permission verification is performed on users and then performed on applications installed in user terminals. Only transactions requested by reliable users and applications may be processed through the permission verification. That is, with the foregoing permission verification, it is possible to secure predetermined reliability of transactions that are actually processed through the blockchain network 300.

Next, a procedure in which a transaction having passed the permission verification is processed will be described in detail with reference to FIG. 5. For convenience of description, it is assumed that a transaction having passed the permission verification includes a payer (or a sender) of a electronic currency sending a predetermined electronic currency to a payee (or a recipient).

Figure 5:
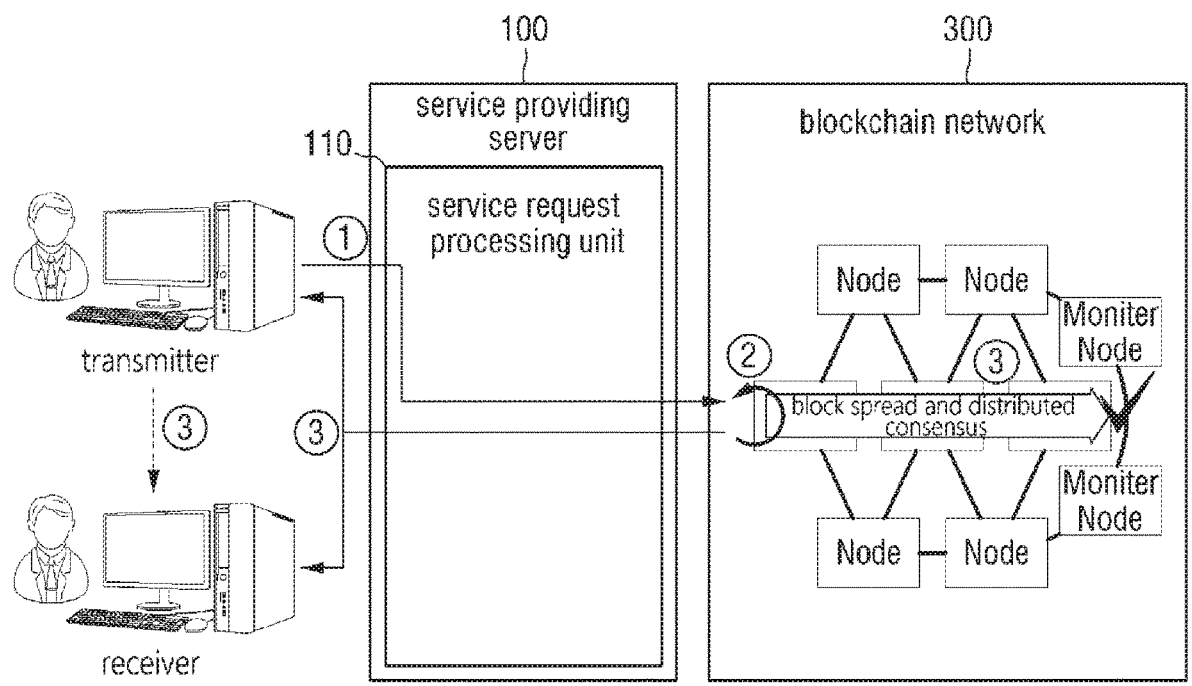
FIG. 5 is a conceptual diagram illustrating a procedure of processing a transaction requested by the blockchain-based real-time transaction processing system.

Referring to FIG. 5, a service providing server 100 transfers a requested transaction to a first blockchain node among a plurality of blockchain nodes that constitute a blockchain network 300, particularly, that distribute and manage a transaction blockchain 300*b* in response to a transaction processing request received from a terminal of a payer, and performs a first process of acquiring a validity verification result for the requested transaction from the first blockchain node ((①, ②)).

When the requested transaction is valid, the service providing server 100 performs a second process in which a electronic currency is transferred from an electronic wallet of the payer to an electronic wallet of a payee according to the requested transaction, and notifies terminals of the payer and the payee that the transaction processing is complete (③).

Also, a second blockchain node or the like among the plurality of blockchain nodes that constitute the blockchain network 300, particularly, that distribute and manage the transaction blockchain 300b records data for the requested transaction in a new block and performs a third process in which the new block is spread over a blockchain network 300 (③).

Since the second process and the third process are processed in parallel, the requested transaction is immediately processed before the new block is created and then transaction data for the new block is recorded and confirmed. Thus, it is possible to provide a real-time transaction processing service to a user.

According to an embodiment of the present disclosure, while the third process is processed, permission verification may be performed on a block creating node. In detail, a block creating node that has created a new block through a mining process may recode its own permission information (e.g., electronic signature information) as well as the data for the requested transaction in the new block. When the new block is spread over the blockchain network 300, a blockchain node may receive the new block. In this case, the blockchain node may compare permission information recorded in the new block to permission information of a white list for the block creating node prestored in the transaction blockchain 300b to determine whether to add the new block. That is, each blockchain node may operate to add only a new block created by an authenticated and/or authorized block creating node to blockchain data.

The procedure in which a real-time transaction is processed in the blockchain-based real-time transaction processing system has been described with reference to FIGS. 4A to 5. As described above, only a transaction requested by a reliable user by using a reliable application may be processed in the permission-based blockchain network according to an embodiment of the present disclosure. Also, only a new block created by a reliable block creating node may be added to the blockchain data. Accordingly, a transaction validated through the blockchain data will be verified as a valid transaction even when other blockchain nodes perform verification, and thus a transaction that has been validated once may be predicted to be necessarily recorded in the blockchain data. Through such a prediction, when a requested transaction is validated only once, the requested transaction may be immediately processed even before the transaction is recorded in the blockchain data, and a real-time transaction processing service may be provided without any change in a blockchain structure.

The configuration and operation of the service providing server 100, which is an element of the blockchain-based real-time transaction processing system, will be described below with reference to FIGS. 6 and 7.

Figure 6:
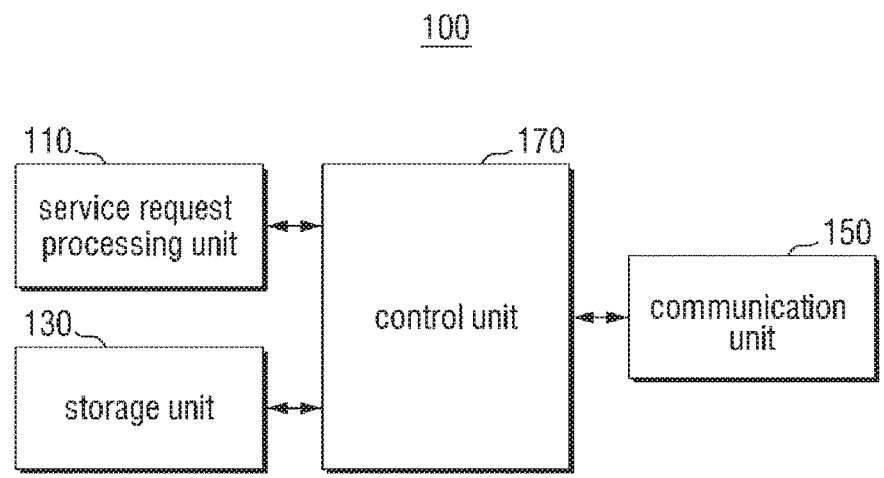
FIG. 6 is an exemplary block diagram showing a service providing server 100, which is one element of the blockchain-based real-time transaction processing system.

First, FIG. 6 is an example block diagram showing the service providing server 100 according to an embodiment of the present disclosure.

Referring to FIG. 6, the service providing server 100 may include a service request processing unit 110, a storage unit 130, a communication unit 150, and a control unit 170. However, only elements associated with this embodiment of the present disclosure are shown in FIG. 6. Therefore, those skilled in the art will understand that other general-purpose elements may be provided in addition to the elements shown in FIG. 6. Further, the elements of a payment service providing server shown in FIG. 6 indicate functional elements that are classified by function, and it will be appreciated that at least one element may be given in combination form in a real physical environment.

The elements are as follows. The service request processing unit 110 receives various requests from a user terminal 400 and provides results corresponding to the requests. For example, the service request processing unit 110 interoperates with a blockchain network 300 to process a transaction requested by the user terminal 400.

In detail, the service request processing unit 110 performs permission verification on a user and/or an application installed in the user terminal 400 in response to a transaction processing request received from the user terminal 400, and processes a requested transaction through the blockchain network 300 when the permission verification is successful. The description thereof is the same as described above, and thus will be omitted to avoid repetitive description. The operation of the service request processing unit 110 will be further described with additional reference to FIG. 8.

The storage unit 130 may non-temporarily store one or more computer programs for performing various operations of the service providing server 100. The storage unit 130 may include a nonvolatile memory such as a read only memory (ROM), an erasable programmable ROM (EPROM), an electrically erasable programmable ROM (EEPROM), a flash memory, etc., a hard disk drive, a detachable disk drive, or any computer-readable recording medium well-known in the technical field of the present disclosure.

The communication unit 150 performs data communication with other elements of the blockchain-based real-time transaction processing system. To this end, the communication unit 150 may include a wired Internet module, a mobile communication module, or a wireless communication module.

The control unit 170 controls the entire operation of the elements of the service providing server 100. The control unit 170 may include a central processing unit (CPU), a microprocessor unit (MPU), a microcontroller unit (MCU), or any processor well-known in the technical field of the present disclosure. Further, the control unit 170 may perform an operation for at least one application or program to implement the method according to the foregoing exemplary embodiments of the present disclosure.

The elements of FIG. 6 may indicate software elements or hardware elements such as a field programmable gate array (FPGA) or an application-specific integrated circuit (ASIC). However, the elements are not limited to software or hardware elements, but may be configured to be in a storage medium capable of be addressed or configured to run one or more processors. The functions provided in the foregoing elements may be achieved with more subdivided elements, and may be achieved by one element for performing a specific function by combining a plurality of elements.

Figure 7:
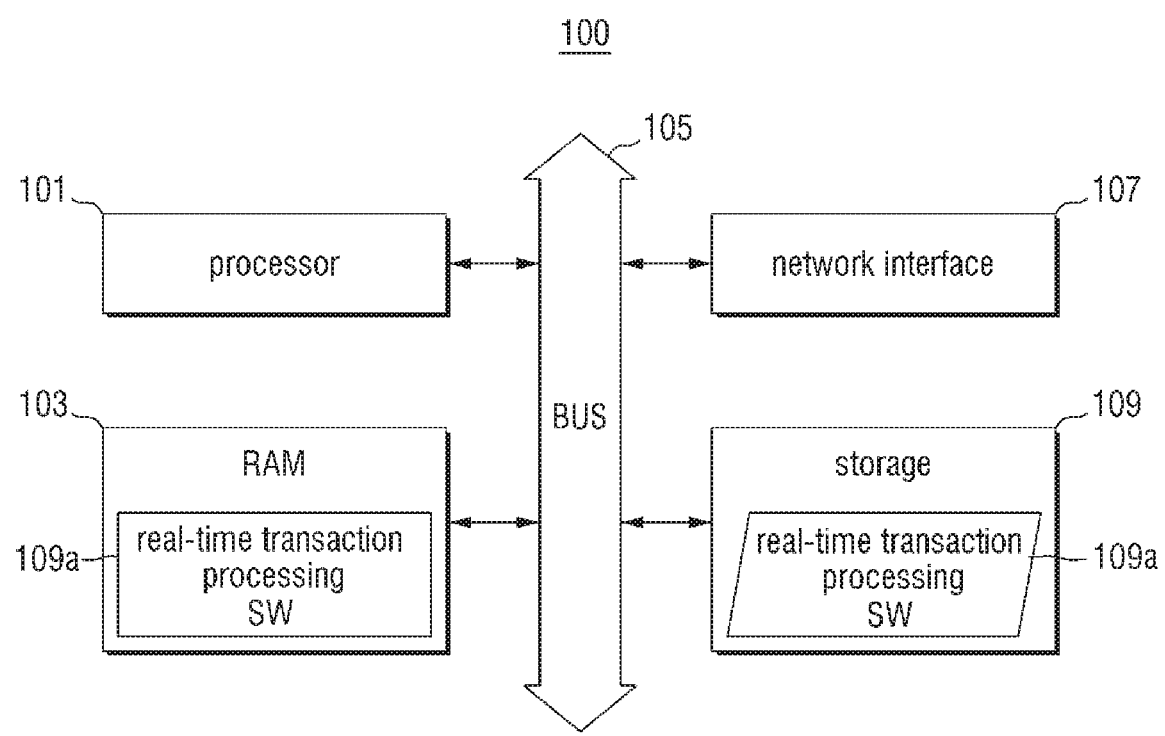
FIG. 7 is a hardware configuration diagram of the service providing server 100, which is one element of the blockchain-based real-time transaction processing system.

Next, FIG. 7 is a hardware configuration diagram of the service providing server 100 according to an embodiment of the present disclosure.

Referring to FIG. 7, the service providing server 100 may include one or more processors 101, a bus 105, a network interface 107, a memory 103 configured to load a computer program to be executed by the processor 101, and a storage 109 configured to store blockchain-based real-time transaction processing software 109a. However, only elements associated with this embodiment of the present disclosure are shown in FIG. 7. Therefore, those skilled in the art will understand that other general-purpose elements may be provided in addition to the elements shown in FIG. 7.

The processor 101 controls the entire operation of the elements of the service providing server 100. The processor 101 may include a CPU, a MPU, a MCU, a graphic processing unit (GPU), or any processor well-known in the technical field of the present disclosure. Further, the processor 101 may perform an operation for at least one application or program to implement the method according to the foregoing exemplary embodiments of the present disclosure. The service providing server 100 may include one or more processors.

The memory 103 may store various kinds of data, commands, and/or information. The memory 103 may load one or more programs 109a from the storage 109 to implement the blockchain-based real-time transaction processing method according to exemplary embodiments of the present disclosure. As an example of the memory 103, a RAM is shown in FIG. 7.

The bus 105 provides a communication function between the elements of the service providing server 100. The bus 105 may be implemented as various buses such as an address bus, a data bus, and a control bus.

The network interface 107 supports wired/wireless Internet communication of the service providing server 100. Also, the network interface 107 may support various communication methods in addition to Internet communication. To this end, the network interface 107 may include a communication module well-known in the technical field of the present disclosure.

The storage 109 may non-temporarily store the one or more programs 109a. As an example of the one or more programs 109a, the blockchain-based real-time transaction processing software 109a is shown in FIG. 7.

The storage 109 may include a nonvolatile memory such as a ROM, an EPROM, an EEPROM, a flash memory, etc., a hard disk drive, a detachable disk drive, or any computer-readable recording medium well-known in the technical field of the present disclosure.

The blockchain-based real-time transaction processing software 109a may perform the blockchain-based real-time transaction processing method according to an exemplary embodiment of the present disclosure.

For example, the blockchain-based real-time transaction processing software 109a is loaded from the memory 103 and enables one or more processors 101 to execute an operation for performing a first process of receiving a processing request for a target transaction from a terminal of a payer, transferring the processing request for the target transaction to a first blockchain node among a plurality of blockchain nodes in response to the reception, and acquiring a validity verification result for the target transaction from the first blockchain node, an operation for performing a second process of transferring a electronic currency from an electronic wallet of the payer to an electronic wallet of a payee according to the target transaction, etc.

The configuration and operation of the server providing server 100 according to an embodiment of the present disclosure has been described with reference to FIGS. 6 and 7. Next, the blockchain-based real-time transaction processing method will be described in detail with reference to FIG. 8.

The steps of the blockchain-based real-time transaction processing methods according to an embodiment of the present disclosure, which will be described below, may be performed by a computing apparatus. For example, the computing apparatus may be the service providing server 100 or a blockchain node of the blockchain network 300. For convenience of description, however, an operating entity of each of the steps included in the blockchain-based real-time transaction processing method will be omitted. Also, the steps of the blockchain-based real-time transaction processing method may be implemented by operations of a computer program executed by a processor.

FIG. 8 is a flowchart of the blockchain-based real-time transaction processing method. However, this is merely an exemplary embodiment for achieving an object of the present disclosure, and it will be appreciated that some steps may be included or excluded if necessary.

Referring to FIG. 8, in step S10, a processing request for a target transaction is received from a user terminal 400.

In step S20, the service providing server 100 transfers the target transaction to a first blockchain node 300a in response to the request for the target transaction.

In step S30, the first blockchain node 300a verifies validity of the target transaction by means of prestored blockchain data in response to the reception of the target transaction.

According to an embodiment of the present disclosure, permission verification may be performed on a user and an application installed in the user terminal 400 before step S30. The description thereof will be omitted to avoid repetitive description.

In step S40, the service providing server 100 receives a validity verification result for the target transaction. Also, the service providing server 100 may immediately process the target transaction under a reasonable expectation that the target transaction will necessarily be recorded in blockchain data.

In step S50, the service providing server 100 notifies the user terminal 400 that the processing of the target transaction is complete.

In step S60, the first blockchain node 300a creates a new block and records the target transaction in the new block. FIG. 8 shows an example in which the first blockchain node 300a that has verified the validity of the target transaction creates a new block, but this may be changed as desired. Also, the first blockchain node 300a may record its own permission information in the new block in addition to the data for the target transaction. This may be used by the first blockchain node 300a to perform permission verification later, and the description thereof will be omitted to avoid repetitive description.

In FIG. 8, step S60 is shown as being performed after step S50, but this reflects that a predetermined time is usually required for block creation, and does not mean that there is a temporal order between the two steps S50 and S60. As described above, the steps S50 and S60 performed after the validity of the target transaction is verified may be performed in parallel.

In step S70, the new block is spread over a blockchain network 300.

In step S80, when the new block is received, second to nth blockchain nodes 300b to 300n verify the validity of the transaction and record the new block in the blockchain data. In this case, permission verification may be performed in advance on the first blockchain node 300a that has created the new block.

In step S90, a distribution consensus is achieved among blockchain nodes constituting the blockchain network 300.

In step S100, the service providing server 100 receives a transaction confirmation notification. In FIG. 8, the service providing server 100 is shown as receiving the transaction confirmation notification from the first blockchain node

300*a*. However, it will be appreciated that the service providing server 100 may receive the transaction confirmation notification from another blockchain node.

The blockchain-based real-time transaction processing method according to an embodiment of the present disclosure has been described with reference to FIG. 8. According to the above description, it is possible to immediately process a target transaction before the transaction is recorded in a new block, on the basis of previously secured reliability. Thus, it is possible to provide a real-time transaction service while maintaining a blockchain structure based on decentralization without intervention by a third party. Also, since the real-time transaction service is provided, it is possible to improve satisfaction of users who use the transaction service. Also, since the real-time transaction service is provided, the blockchain technology may be utilized in various fields such as a financial field, and thus it is possible to mitigate restrictions on an application range of the blockchain technology.

According to the present disclosure, reliability of a user who uses a transaction processing service and reliability of a blockchain node which performs transaction processing are secured in advance by using a permission-based blockchain network. In addition, a pre-processing process of a electronic currency according to a requested transaction on the basis of the secured reliability and a confirmation processing process of the requested transaction may be performed in parallel. Thus, it is possible to provide a real-time transaction service while maintaining a blockchain structure based on decentralization without intervention by a third party.

Also, since the real-time transaction service is provided, it is possible to improve satisfaction of users who use the transaction service.

Also, since the real-time transaction service is provided, the blockchain technology may be utilized in various fields such as a financial field, and thus it is possible to mitigate restrictions on an application range of the blockchain technology.

Also, it is also possible to shorten a time required for transaction confirmation in the blockchain network by decreasing a block creation time on the basis of the secured reliability.

It should be noted that effects of the present disclosure are not limited to the above-described effects, and other effects of the present disclosure will be apparent to those skilled in the art from the following descriptions.

The concepts of the invention described above with reference to FIGS. 3 to 8 can be embodied as computer-readable code on a computer-readable medium. The computer-readable medium may be, for example, a removable recording medium (a CD, a DVD, a Blu-ray disc, a USB storage apparatus, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A blockchain-based real-time transaction processing method performed by a blockchain-based transaction processing system including a service-providing server, a blockchain-based management apparatus and a plurality of blockchain nodes constituting a blockchain network, each of the plurality of blockchain nodes implemented as a computing apparatus or one of a plurality of virtual machines on the computing apparatus, the blockchain-based real-time transaction processing method comprising:

performing, by the service-providing server, a first process, the first process comprising:
receiving a processing request for a target transaction from a terminal of a payer, wherein the payer is a first user of the blockchain network,
transferring the processing request to a first blockchain node among the plurality of blockchain nodes in response to the receiving the processing request, and
acquiring a verification result for the target transaction from the first blockchain node;

calculating, by the blockchain-based management apparatus, an average block creation time of the blockchain network;

determining, by the blockchain-based management apparatus and based on whether an electronic wallet application is installed in the terminal of the payer, a degree of reliability of the blockchain network;

obtaining an adjusted degree of difficulty by adjusting, by the blockchain-based management apparatus, a first degree of difficulty of block creation based on the calculated average block creation time and based on the degree of reliability;

performing in parallel when the verification result indicates that the target transaction is valid, by the service-providing server and a second blockchain node among the plurality of blockchain nodes, a plurality of processes, the plurality of processes including:
a second process, by the service-providing server, the second process comprising transferring a transfer amount of electronic currency from the electronic wallet application of the payer to a second electronic wallet application of a payee according to the target transaction, and
a third process, by the second blockchain node, the third process comprising:
generating a new block based on the adjusted degree of difficulty,
recording data for the target transaction in the new block, and
spreading the new block over the blockchain network;

when the verification result indicates that the target transaction is not valid:
rejecting, by the service-providing server, the processing request from the terminal of the payer.

2. The blockchain-based real-time transaction processing method of claim 1, wherein the blockchain network is a permission-based blockchain network in which only allowed users and only allowed blockchain nodes participate.

3. The blockchain-based real-time transaction processing method of claim 2, further comprising:
   distributing and storing, by the service-providing server, first blockchain data in which a first plurality of blocks are connected in a first chain structure,
   distributing and storing, by the service-providing server, second blockchain data in which a second plurality of blocks are connected in a second chain structure,
   wherein the second blockchain data is configured separately from the first blockchain data,
   wherein the first blockchain data includes first permission information of a user and second permission information of a blockchain node, and
   wherein the second blockchain data includes a transaction record.

4. The blockchain-based real-time transaction processing method of claim 1, wherein the performing, by the service-providing server, the first process further comprises:
   receiving identification information of the payer along with the processing request for the target transaction;
   acquiring, from the blockchain network and based on the identification information of the payer, permission information of the payer; and
   performing, using the permission information, a permission verification with respect to the payer,
   wherein the transferring the processing request for the target transaction to the first blockchain node is limited to only transferring the processing request when a result of the permission verification indicates that the permission information of the payer is valid.

5. The blockchain-based real-time transaction processing method of claim 1, wherein the performing, by the service-providing server, the first process further comprises:
   receiving, along with the processing request for the target transaction, application programming interface (API) key information of the electronic wallet application; and
   performing permission verification with respect to the electronic wallet application by checking whether the blockchain network is aware of the API key information,
   wherein the transferring the processing request for the target transaction to the first blockchain node is limited to only transferring the processing request when a result of the permission verification with respect to the electronic wallet application indicates that the API key information of the electronic wallet application is valid.

6. The blockchain-based real-time transaction processing method of claim 1, wherein the plurality of blockchain nodes includes a third blockchain node,
   wherein the performing, by the second blockchain node, the third process further comprises:
      creating the new block through a mining process,
      recording target transaction data and permission information of the second blockchain node in the new block, and
      spreading the new block over the blockchain network; and
   wherein the blockchain-based real-time transaction processing method further comprises:
      determining, by the third blockchain node among the plurality of blockchain nodes, whether to add the new block, based on comparing permission information prestored in blockchain data to the permission information of the second blockchain node recorded in the new block.

7. The blockchain-based real-time transaction processing method of claim 1, wherein the plurality of blockchain nodes includes a monitoring node, the blockchain-based real-time transaction processing method further comprising:
   detecting, by the monitoring node, that a block creation node among the plurality of blockchain nodes has created a first new block;
   calculating, by the monitoring node, a block creation time based on a timestamp value recorded in the first new block; and
   transmitting, by the monitoring node, the calculated block creation time to the blockchain-based management apparatus.

8. A blockchain-based real-time transaction processing system comprising:
   a plurality of blockchain nodes comprising a first blockchain node and a second blockchain node, each of the plurality of blockchain nodes implemented as a computing apparatus or one of a plurality of virtual machines on the computing apparatus, wherein the plurality of blockchain nodes form a blockchain network;
   a blockchain-based management apparatus configured to:
      calculate an average block creation time of the blockchain network;
      determine, based on whether an electronic wallet application is installed in a terminal of a payer, a degree of reliability of the blockchain network;
      obtain an adjusted degree of difficulty by adjusting a first degree of difficulty of block creation based on the calculated average block creation time and based on the degree of reliability; and
   a service-providing server,
   wherein the service-providing server is configured to perform a first process including:
      receiving a processing request for a target transaction from the terminal of the payer, wherein the payer is a first user of the blockchain network,
      transferring the processing request for the target transaction to the first blockchain node, in response to receiving the processing request,
      acquiring a verification result for the target transaction from the first blockchain node, and
   the service-providing server and the second blockchain node are configured to perform in parallel when the verification result indicates that the target transaction is valid a plurality of processes including:
      a second process, configured for performance by the service-providing server, of transferring a transfer amount of electronic currency from the electronic wallet application of the payer to a second electronic wallet of a payee according to the target transaction, and
      a third process, configured for performance by the second blockchain node, the third process comprising:
         generating a new block based on the adjusted degree of difficulty,
         recording data for the target transaction in the new block, and
         spreading the new block over the blockchain network, and the service-providing server is configured to, when the verification result indicates that the target transaction is not valid, reject the processing request from the terminal of the payer.

9. The blockchain-based real-time transaction processing system of claim 8, wherein the blockchain network is a permission-based blockchain network in which only allowed users and only allowed blockchain nodes participate.

10. The blockchain-based real-time transaction processing system of claim 9,
wherein the service-providing server is configured to distribute and store first blockchain data in which a first plurality of blocks are connected in a first chain structure,
wherein the service-providing server is further configured to distribute and store second blockchain data in which a second plurality of blocks are connected in a second chain structure,
wherein the second blockchain data is configured separately from the first blockchain data,
wherein the first blockchain data includes first permission information of a user and second permission information of a blockchain node, and
wherein the second blockchain data includes a transaction record.

11. The blockchain-based real-time transaction processing system of claim 8, wherein the first process, configured for performance by the service-providing server, further includes:
receiving identification information of the payer along with the processing request for the target transaction;
acquiring, from the blockchain network and based on the identification information of the payer, permission information of the payer; and
performing, using the permission information, a permission verification with respect to the payer,
wherein the transferring the processing request for the target transaction to the first blockchain node is limited to only transferring the processing request when a result of the permission verification indicates that the permission information of the payer is valid.

12. The blockchain-based real-time transaction processing system of claim 8, wherein the first process, configured for performance by the service-providing server, further includes:
receiving, along with the processing request for the target transaction, application programming interface (API) key information of the electronic wallet application; and
performing permission verification on the electronic wallet application by checking whether the blockchain network is aware of the API key information;
wherein the transferring the processing request for the target transaction to the first blockchain node is limited to only transferring the processing request when a result of the permission verification indicates that the permission information of the electronic wallet application is valid.

13. The blockchain-based real-time transaction processing system of claim 8, further comprising a third blockchain node among the plurality of blockchain nodes,
wherein the third process, configured for performance by the second blockchain node, further includes:
creating the new block through a mining process,
recording target transaction data and permission information of the second blockchain node in the new block, and
spreading the new block over the blockchain network, and
wherein the third blockchain node is configured to:
receive the new block,
compare permission information prestored in blockchain data to permission information of the second blockchain node recorded in the new block, and
determine whether to add the new block based on a result of the comparison.

14. The blockchain-based real-time transaction processing system of claim 8, further comprising a monitoring node among the plurality of blockchain nodes, wherein the monitoring node is configured to:
detect that a block creation node among the plurality of blockchain nodes has created a first new block,
calculate a block creation time based on a timestamp value recorded in the first new block in response to the detection that the block creation node among the plurality of blockchain nodes has created the new block, and
transmit the calculated block creation time to the blockchain-based management apparatus.

* * * * *